(12) United States Patent
Busdiecker et al.

(10) Patent No.: US 7,420,292 B2
(45) Date of Patent: Sep. 2, 2008

(54) VEHICLE BUS CONTROL SYSTEM

(75) Inventors: Matthew R. Busdiecker, Royal Oak, MI (US); Douglas A. Hughes, Wixom, MI (US)

(73) Assignee: Eaton Corporation, Cleveland, OH (US)

(*) Notice: Subject to any disclaimer, the term of this patent is extended or adjusted under 35 U.S.C. 154(b) by 153 days.

(21) Appl. No.: 11/403,300

(22) Filed: Apr. 13, 2006

(65) Prior Publication Data
US 2007/0241614 A1 Oct. 18, 2007

(51) Int. Cl.
*B60L 1/00* (2006.01)
*B60L 3/00* (2006.01)

(52) U.S. Cl. ........................ 307/11; 307/10.1

(58) Field of Classification Search ............... 307/10.1, 307/11
See application file for complete search history.

(56) References Cited

U.S. PATENT DOCUMENTS

| | | | | |
|---|---|---|---|---|
| 5,066,919 A | * | 11/1991 | Klassen et al. | 324/538 |
| 5,825,097 A | * | 10/1998 | Saito et al. | 307/10.1 |
| 5,925,993 A | | 7/1999 | Lansberry | |
| 5,936,318 A | * | 8/1999 | Weiler et al. | 307/66 |
| 5,991,669 A | | 11/1999 | Dominke et al. | |
| 6,130,487 A | * | 10/2000 | Bertalan et al. | 307/9.1 |
| 6,218,740 B1 | * | 4/2001 | Mildice | 307/10.1 |
| 6,275,398 B1 | * | 8/2001 | Sumimoto et al. | 363/89 |
| 6,484,520 B2 | * | 11/2002 | Kawaguchi et al. | 62/133 |
| 6,511,399 B2 | | 1/2003 | Mc Collum Etchason et al. | |
| 6,579,206 B2 | | 6/2003 | Liu et al. | |
| 6,679,344 B1 | | 1/2004 | Bertram et al. | |
| 6,727,670 B1 | | 4/2004 | Grabowski et al. | |
| 6,769,521 B2 | * | 8/2004 | Saito et al. | 191/2 |
| 6,889,126 B2 | | 5/2005 | Komiyama et al. | |
| 6,925,363 B2 | * | 8/2005 | Hutton | 700/295 |
| 7,098,555 B2 | * | 8/2006 | Glahn et al. | 307/32 |
| 2004/0123164 A1 | | 6/2004 | Chapuis et al. | |
| 2004/0124703 A1 | | 7/2004 | Tani et al. | |
| 2004/0155624 A1 | | 8/2004 | Amano et al. | |
| 2004/0168840 A1 | | 9/2004 | Kuang et al. | |
| 2004/0222639 A1 | | 11/2004 | Turner et al. | |
| 2004/0232769 A1 | * | 11/2004 | Pickering | 307/10.1 |
| 2005/0151517 A1 | | 7/2005 | Cook et al. | |
| 2005/0285445 A1 | | 12/2005 | Wruck et al. | |

FOREIGN PATENT DOCUMENTS

DE 10311396 9/2004
WO WO02/08574 1/2002

* cited by examiner

*Primary Examiner*—Stephen W Jackson
*Assistant Examiner*—Michael Rutland Wallis
(74) *Attorney, Agent, or Firm*—Honigman Miller Schwartz & Cohn LLP

(57) ABSTRACT

A vehicle power bus control system including a control module having a communication interface and a device having a communication interface for communicating with the control module wherein the control module is adapted to transfer at least one electrical limit value to the device, and wherein the device is adapted to act in response to the electrical limit value to self-regulate an electrical quantity associated with the device.

1 Claim, 8 Drawing Sheets

| GENERAL STATUS BROADCAST FROM CONTROL MODULE TO ALL DEVICES |
|---|
| • Bus status: (connected, in process of connecting, disconnected, not known); (fault, no-fault, not known); (safety line clear, safety line set, not known)
• Fault type: chassis leak fault, blown accessory bus fuse, blown main fuse, unable to pre-charge accessory bus, etc...
• Bus voltage
• Total bus current / power |

FIG. 3A

| COMMUNICATION FROM EACH DEVICE TO CONTROL MODULE |
|---|
| • Maximum requested current / power for next x sec
• Actual value of current / power flowing at this time
• Bus connection status: Connected, disconnected, etc...
• Generation request: (In motion - Excess power use do not influence hybrid, In motion - influence hybrid, stationary generation request, Normal request - Do not influence hybrid)
• Type of device, conflict resolution number. |

FIG. 3B

| COMMUNICATION FROM CONTROL MODULE TO EACH DEVICE |
|---|
| • Maximum positive power / current allowed for this device |
| • Minimum negative power / current allowed for this device |
| • Priority of the device (NA = not available to connect to bus) |
| • Permission to connect to bus. |
| • Acknowledgement of operating in privileged mode |
| • Open Fault Line Relay Command |

VEHICLE BUS CONTROL SYSTEM

TECHNICAL FIELD

The present invention relates to bus control systems used in vehicles.

BACKGROUND

Modern vehicles are much more complex than vehicles produced as recently as twenty years ago. One of the most complicated aspects of modern vehicles includes electrical power management amongst systems and communications between systems. In fact, communication between and amongst a vehicle's various systems and subsystems is often implemented using high speed serial bus communication techniques. One such popular serial bus protocol implemented on many vehicle systems is known as the CAN (Controller Area Network) protocol. The CAN protocol is a multi-master protocol for efficiently communicating serial data between a vehicle's systems and subsystems. Other vehicle bus communication protocols are also known such as LIN, MOST, and FLEXRAY. The complexity of vehicle electrical control systems has been exacerbated in recent times by the proliferation of hybrid vehicles. Hybrid vehicles depend upon the combination of both a fossil fuel powered engine and an electric motor to generate a vehicle's propulsion forces.

The efficiency gains promised by hybrid vehicles may in part be attained by the proper monitor and control of the electrical power consumed or generated by one or more vehicle subsystems. It may also be desirable to assign priorities to the various subsystems so that when power demanded by a hybrid vehicle's systems exceeds the vehicle's power generation capability, the highest priority systems can be kept in service while the electrical load imposed by the lower priority systems can be lightened or eliminated.

SUMMARY

A vehicle power bus control system including a control module having a communication interface and a device having a communication interface for communicating with the control module wherein the control module is adapted to transfer at least one electrical limit value to the device and wherein the device is adapted to act on the electrical limit value to self-regulate an electrical quantity associated with the device.

BRIEF DESCRIPTION OF THE DRAWINGS

Embodiments of the invention will now be described, by way of example, with reference to the accompanying drawings, wherein:

FIG. 3A is a table showing exemplary communication information that may be broadcast by the control module to one or more devices, according to an embodiment of the present invention.

FIG. 3B is a table showing exemplary information that may be broadcast from one or more devices to the control module according to an embodiment of the present invention.

FIG. 3C is exemplary information that may be broadcast from the control module to specific devices, according to an embodiment of the present invention.

DETAILED DESCRIPTION

Figure 1:
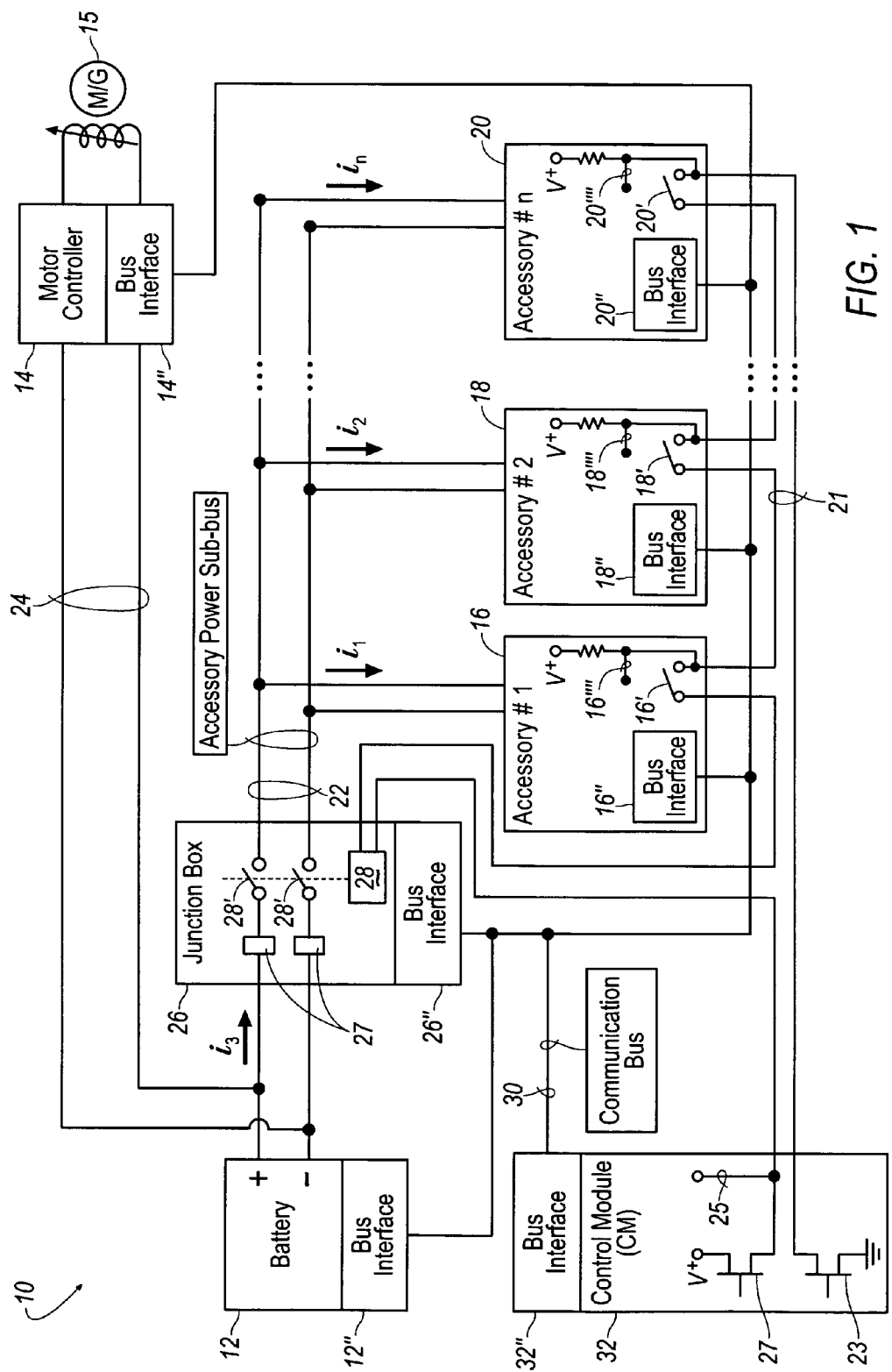
FIG. 1 is a schematic view of a vehicle bus control system according to an embodiment of the present invention.

Now referring to FIG. 1, vehicle bus control system 10 includes one or more batteries 12 which can be used to provide electrical power to one or more electrical devices 14, 16, 18, and 20. Electrical devices 14, 16, 18, 20 are electrical joined to battery 12 by way of one or more busses 22, 24. For example, certain classes of devices (electrical accessories 16, 18, 20) can be connected to battery 12 by way of accessory power sub-bus 22 (only one sub-bus is shown in FIG. 1) whereas other classes of devices (such as motor controller 14), can be connected to battery 12 by way of power bus 24. Although only one sub-bus 22 is shown in FIG. 1, the present invention contemplates the use of one or more sub-busses. For the purpose of this disclosure, a device is any electrical component or system that includes a bus interface while an electrical accessory is any electrical component or system that, at least in a mode of its operation, draws electrical energy from, or sources electrical energy to, accessory power sub-bus 22.

Electrical accessories 16, 18, 20 are connected to battery 12 by way of junction box 26. Junction box 26 may contain one or more fuses 27 which are appropriately sized to protect the electrical conductors servicing the accessories 16, 18, 20 along the accessory power sub-bus 22. Junction box 26 may also contain an isolator device 28 that is used to electrically isolate accessory power sub-bus 22 from battery 12 in the event that one or more electrical accessories 16, 18, 20 malfunctions in a manner that warrants disconnecting all accessories 16, 18, 20 from battery 12. In its simplest embodiment, isolator device 28 includes a relay coil coupled to relay contacts 28'. Isolator device 28 may be wired in series (i.e. "daisy chained") to each drop out relay contact 16', 18', 20' by way of hardware fault line 21. The ends of the chain may be connected to drivers 23, 27 which may be controlled by control module 32 by supplying current (through fault line 21) or by monitoring the state of hardware fault line 21 (by monitoring the voltage at sensor point 25). If one or more of the accessories 16, 18, 20 detect a condition which justifies electrically removing accessory power sub-bus 22 from battery 12, the affected accessory 16, 18, 20 can open its respectively associated drop out relay contact 16', 18', 20' which disengages isolator device 28 which, in turn, causes contacts 28' to open thereby electrically disconnecting accessory power sub-bus 22 from battery 12. Hardware fault line 21 is not under the sole control of control module 32. Accordingly, if control module 32 fails, accessories 16, 18, 20 can still activate isolator device 28.

Each drop out relay contact 16', 18', 20' is daisy chained together by way of hardware fault line 21 and the end of the daisy chain is looped back and terminates at a low side driver 23. Low side driver 23 can be controlled by control module 32. If any accessory 16, 18, 20 detects a fault that requires immediate disconnection of the accessory from accessory power sub-bus 22, the effected accessory 16, 18, 20 will, amongst other things, open its respective drop out relay contact which in turn will cause the isolator device 28 to disconnect the accessory power sub-bus 22 from the battery 12.

During start up mode before accessory power sub-bus is energized, control module 32 may perform system tests including a hardware fault line test. The hardware fault line test can be conducted by using the control module to send sequential communications along communication bus 30 to each accessory 16, 18, 20 sequentially asking each accessory 16, 18, 20 to activate its drop out relay contact 16', 18', 20'.

In addition, it might be advantageous if one or more accessories has the capability to monitor the voltage on the downstream side of its respective drop out relay contact 16', 18', 20'. This may be particularly important for accessory devices that have the ability to source current into the accessory power sub-bus. If it is desirable for an accessory to have the capability to monitor the voltage on the downstream side of its drop out relay contact, a sense line 16"", 18"", 20"" can be monitored by each respective accessory 16, 18, 20. If an accessory 16, 18, 20 detects that the downstream side of its respectively associated drop out relay contact 16', 18', 20' is not connected to ground, the device can be programmed to discontinue supplying power to the accessory power sub-bus 22 or it can be programmed to initiate any number of additional procedures that might be beneficial.

Most devices 14, 16, 18, 20 have at least one mode of operation in which they consume electrical energy (i.e. they require electrical current to be provided to them from their respective bus 22, 24 in order to perform some, or all, of their functions). However, some devices may be capable of sourcing electrical current into their respectively associated bus 22, 24 in some modes of operation. For example, when it is desirable to reduce the speed of the vehicle, motor controller 14 can utilize prime mover (hybrid vehicle electric motor) 15 in a way that causes prime mover 15 to generate electrical current. This electrical current can be coupled to battery 12 by power bus 24 and, in turn, be used to increase the state of charge of the battery 12. Also, it is contemplated that at least one accessory 16, 18, 20 might be an alternator for maintaining battery 12 in a sufficient state of electrical charge.

It may be desirable to stipulate a maximum electrical property (e.g. capacitance, resistance, and inductance) of each electrical device 14, 16, 18, 20. This might be desirable so that system 10 is capable of sourcing, at startup, the initial current draw of each device 14, 16, 18, 20 without causing an unacceptably high current transient flow or an unacceptably large inductive kickback (at shutdown). Also, stipulating a maximum capacitance, resistance, and inductance might also be advantageous if the sub-bus must be disconnected quickly in an emergency. Once the busses 22, 24 have been connected to the battery and, the initial current transients have subsided, the electrical properties of each electrical accessory 16, 18, 20 may, if it's desirable, be switched to more advantageous operating values. In the case where one or more electrical accessories 16, 18, 20 have a large internal capacitance, these devices may require an internal pre-charge circuit that can be activated after their respective bus 22, 24 has been energized. Also, it may be desirable for each accessory 16, 18, 20 to provide sufficient electrical isolation (i.e. ohmic resistance) between each accessory 16, 18, 20 and other vehicle components (such as vehicle chassis, positive and negative supply rails, etc.).

Each device 14, 16, 18, 20 can be provided with a bus interface 14", 16", 18", 20". Other devices, such as junction box 26 and battery 12 can also be coupled to their own respectively associated bus interfaces 12", 26". Each bus interface 12", 14", 16", 18", 20", and 26" communicates along a common communication bus 30. Communication bus 30 also connects to control module 32. Control module 32 also includes its own respectively associated bus interface 32". All devices 12, 14, 16, 18, 20, and 26 that are connected to communication bus 30 may communicate with control module 32 by way of a common bus communication protocol (such as the CAN protocol). If any device 12, 14, 16, 18, 20 or 26 fails to comply with the predetermined communication protocol, action can be taken by the device itself (by way of self diagnostics) or by the control module 32 to disconnect the non-compliant device from its associated bus 22, 24. The disconnecting action may be accomplished by using the control module 32 to send the appropriate command to the offending accessory over communication bus 30. Although specific mention has been made herein to the CAN bus protocol, the present invention contemplates the use of any appropriate communication protocol.

Figure 2:
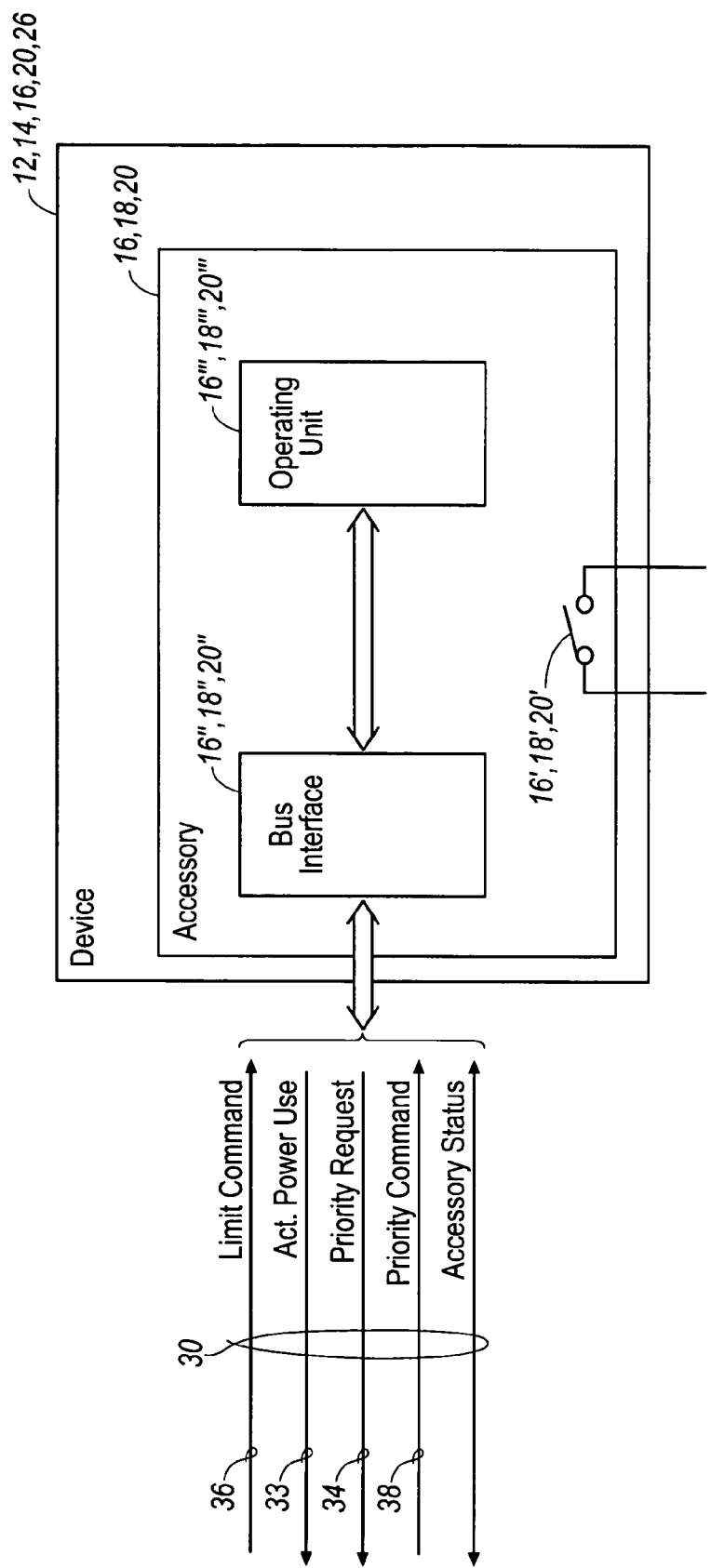
FIG. 2 is a schematic view of a device used in conjunction with the system of FIG. 1 according to an embodiment of the present invention.

Now referring to FIGS. 1 and 2, each accessory 16, 18, 20 may include a respectively associated bus interface 16", 18", and 20". Additionally, other devices (such as battery 12, motor controller 14, and junction box 26) may also include respectively associated bus interfaces 12", 14", and 26" for reporting various operational values to control module (such as power from/to battery, power from/to hybrid motor, etc.). Each electrical accessory 16, 18, 20 includes a respectively associated bus interface 16", 18", 20". Each bus interface 16", 18", 20" interfaces with a respectively associated operating unit. For example, accessory 16 might contain a radio receiver operating unit, electrical accessory 18 might contain an air conditioning unit operating unit, and electrical accessory 20 might contain an ABS operating unit. Each operating unit 16''', 18''', and 20''' is capable of placing information on communication bus 30 by way of it's respectively associated bus interface 16", 18", 20". Information placed on communication bus 30 by one or more accessory 16, 18, 20 is primarily intended to be received by control module 32; however, it is contemplated within the scope of this invention that accessories 16, 18, 20 can place information on communication bus 30 which is intended for receipt by other devices 12, 14, 16, 18, 20, 26 joined to communication bus 30 by way of a respectively associated bus interface.

By way of example, and without limitation, each accessory 16, 18, 20 may be capable of placing information on communication bus 30 which is particular to that accessory's state. For example, each accessory 16, 18, 20 may from time to time report to control module 32 the actual electrical energy 33 being consumed by the accessory as provided by power sub-bus 22. The format for reporting the energy consumption of an accessory can be formatted in any number of ways including for example, power averaged over a given interval, average maximum power consumed and/or average minimum power consumed, or any other meaningful measure of power or proxy therefore. There may be occasions where it is advantageous to report to control module 32 the electrical current that an accessory 16, 18, 20 is drawing from bus 22 or to report the voltage drop across an accessory 16, 18, 20. Additionally, each accessory 16, 18, 20 may be adapted to report its priority setting or request a reallocation of its priority setting 34. Of course control module 32 may not be obligated to honor a priority request reassignment but may do so if appropriate. It is envisioned that in most applications, the final arbiter of an accessory's priority allocation will be a central controller (such as control module 32).

Each accessory 16, 18, 20 is capable of receiving an upper electrical limit command setting 36 from control module 32. This upper electrical limit command setting 36 is used by operating unit 16''', 18''', 20''' to set the uppermost electrical consumption allowed by accessory 16, 18, 20. Electrical consumption can be quantified in units of energy, power, current, voltage or any other electrical quantity that may be appropriate. If, during the normal operation of accessory 16, 18, 20, control module 32 detects that a particular accessory 16, 18, 20 has exceeded its upper electrical limit command setting 36, control module 32 can be programmed to take any number of actions including disabling the function of the accessory 16, 18, 20 and/or disabling its electrical connection to bus 22.

Not only is each accessory 16, 18, 20 capable of requesting a reallocation of its priority setting 34, but it is also capable of receiving a priority command 38 from control module 32. The control module 32 carries out a priority allotment procedure for determining the maximum electrical consumption or maximum electrical generation allocated to each accessory. If insufficient electrical supply exists to fill the total demand of all devices, then control module 32 may command one or more lower priority devices to isolate themselves from bus 22. In the alternative, control module 32, may be used to issue a reduced power command consumption allocation to one or more devices (by reducing a device's upper electrical limit command setting). The system 10 can be designed such that the devices 12, 14, 16, 18, 20, and 26 can request that the system generate power specifically for their consumption; however, these requests do not have to be followed by the control module. Devices that are capable of sourcing electrical energy into one or more bus 22, 24 must not exceed their lower (or negative) electrical limit command setting 36 and, like power consuming devices, they can be required to report the quantity of electricity they are returning to their respective bus 22, 24.

Although it is not required in carrying out the present invention, there may be distinct advantages in assigning each device its own unique source address (with respect to bus 30). Furthermore, there may be advantages in designing system 10 such that accessories and devices are "arbitrary address capable" since preferred addresses for many accessories and devices may not be established or defined at the time the system is designed. By enabling the accessories 16, 18, 20, to be "arbitrary address capable", the control module 32 can respond to any device irrespective of the device's source address as long as the device complies with the bus communication protocol. This will enable system 10 to accept add on devices even after the system is operating in the field.

Although some of the communications between accessories 16, 18, 20, and control module 32 are discussed in conjunction with FIG. 2, FIGS. 3A-3C set forth examples of the type of information exchange that can take place between the control module and the accessories and devices. Some of the status broadcasts may have multiple fields. For example, the "Bus Status" broadcast shown in FIG. 3A has three distinct fields (each field delimiter is shown as a semicolon in FIG. 3A). The information set forth in FIGS. 3A-3C is meant to be exemplary and not exhaustive. Additionally, it is contemplated that some of the accessories and some of the devices may not be required to communicate some, or any, of the information discussed in conjunction with FIGS. 2, 3A, 3B, and 3c.

Control module 32 and devices 16, 18, 20, 26, 12, and 14 may be configured to contain internal processing units that control their function. Generally, these internal processing units have a power down state, during which their internal control logic is not operating. In order to "awaken" the internal processing unit, some initiating signal is provided to the device that causes it to commence power up and thereby initiate an internal logic sequence. The source of the initiating signal may be one or more sources of, for example, a user input (such as a certain position on the ignition key switch), a signal from some other device, the control module 32, or an internal timer. Throughout this disclosure, the initiating event (s) will be referred to as the "power up conditions."

Figure 4A:
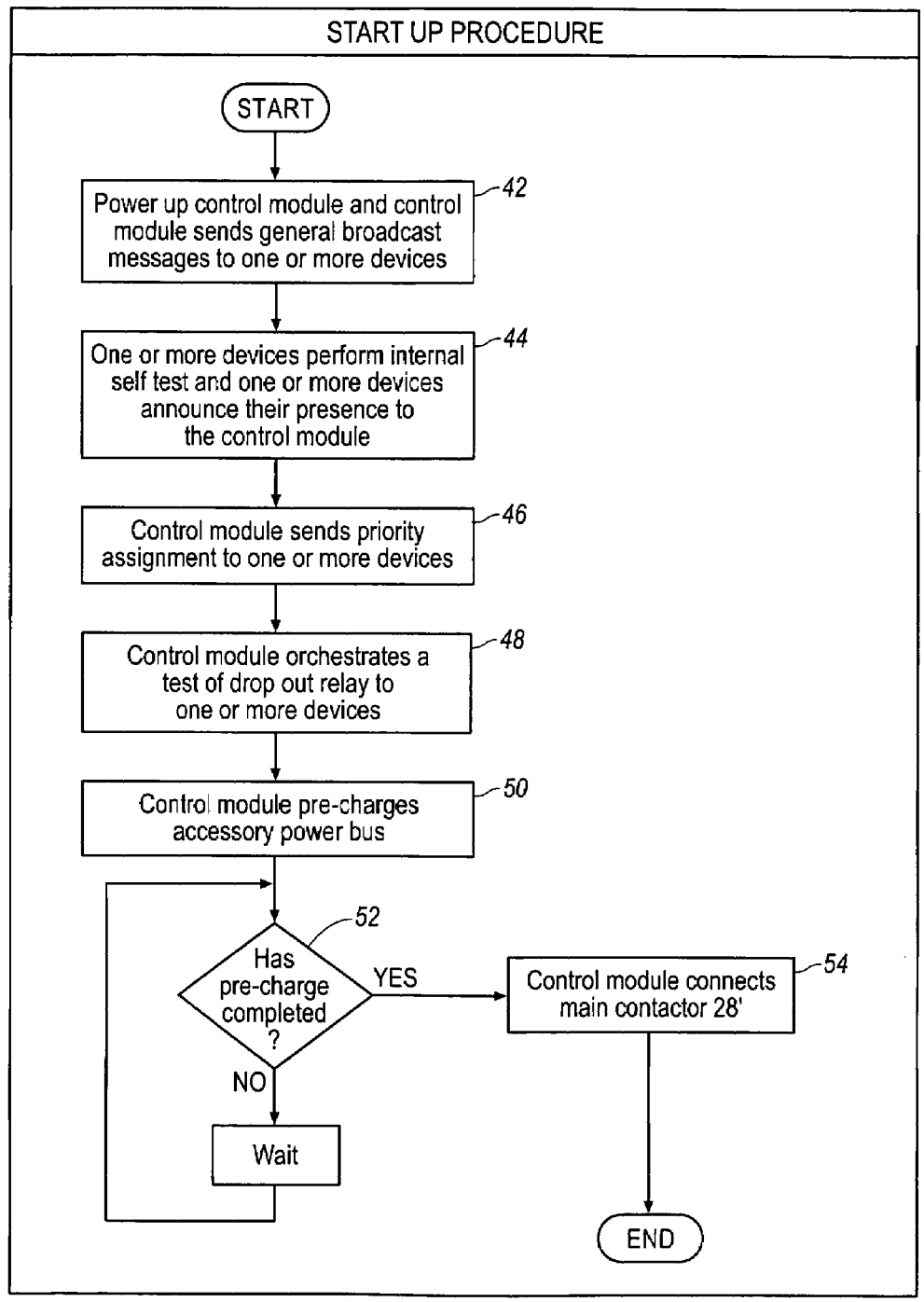
FIGS. 4A and 4B are logic flow diagrams depicting exemplary steps that can be carried out in a start up and run procedure in an embodiment of the present invention.

The startup and run procedure will now be discussed in conjunction with FIGS. 4A and 4B respectively. Upon detecting assertion of one or more power up conditions, each control module 32 begins its power-up sequence and the control module 32 may send one or more general broadcast messages 42 to all bus interface enabled devices 12, 14, 16, 18, 20, 26. Some of the types of general broadcast messages that the control module 32 may send are found in FIG. 3A. The general status broadcast examples given in FIG. 3A are exemplary and they are not required in implementing the present invention. Also, it is contemplated that general broadcast status messages in addition to the ones shown in FIG. 3A can also be implemented.

Upon power up, all devices having a bus interface may perform one or more internal self tests 44 and announce their presence to the control module 32. At some point during the startup procedure, control module 32 may assign a priority to one or more devices and may send each device 46 its assigned priority. There may be no need for the control module 32 to assign a priority to devices that are not power consumption devices. For example, it is contemplated that some of the devices (e.g. junction box 26) will not be a power consumption devices and accordingly it may not serve a purpose to assign a priority to a non-power consuming/producing device.

During startup, the control module 32 may be programmed to conduct tests on each accessory 16, 18, 20. One such test, for example, may be carried out by using control module 32 to send 48 the appropriate command along communication bus 30 thereby requesting each accessory to activate its respectively associated dropout relay contact 16', 18', 20'. By conducting such a test 48, control module 32 can ensure that the isolator device 28 will effectively isolate accessory bus 22 from battery 12 if a hardware fault develops in any of the accessories 16, 18, 20.

If the dropout relay test of step 48 is successful, control module 32 may initiate pre-charging 50 of the accessory bus 22. Junction box 26, may include hardware to pre-charge the accessory power bus 22 before engaging the main contactors 28'. One way to pre-charge accessory bus 22 is to use junction box to "source" a limited current into the accessory bus, possibly through one or more resistive bridges connected to battery 12, in order to slowly bring the bus voltage up to a minimum value. Alternatively, devices 12, 14, 16 may be configured so that no pre-charge circuit is necessary in the junction box. The pre-charging process can be monitored 52 by circuitry located in the junction box, or control module 32 to detect when the minimum voltage threshold has been reached (effectively indicating that it is appropriate to connect the main contactor). Once the main contactor 28' is connected 54, the accessory power bus is fully energized to the potential established by battery 12.

Once the accessory power bus 22 has been fully energized, the initialization sequence is finished, and the control module 32 may permit 58 one or more of the accessories 16, 18, 20 to draw electrical energy within the limits defined by the maximum positive and maximum negative electrical limit command 55 as established by the control module 32. It is also contemplated, in devices where it is appropriate, that power to a device can be applied (or withdrawn) gradually (i.e. ramped over time) to prevent current surging at startup or current spikes at shutdown.

Figure 4B:
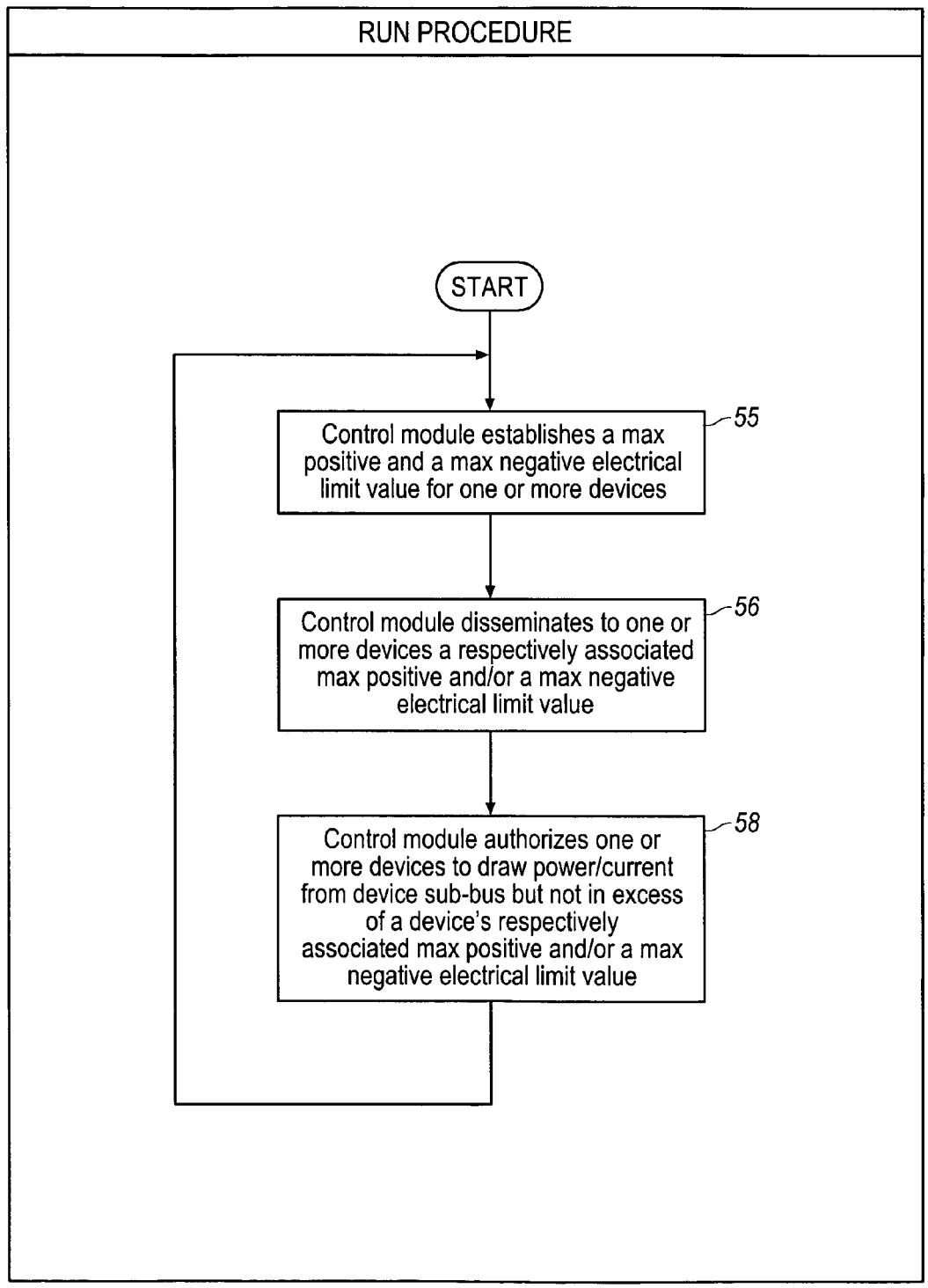

While managing the loads as described in the run procedure FIG. 4B, the control module 32 may sum all of the power/current actually consumed by the accessories (control module 32 can be interfaced to the accessory power sub-bus, or to each power producing device such that it can monitor how much power/current passes through bus 22, 24) and compares that value to the power/current consumption of the devices as they report it to the control module 32. If the power/current actually consumed/produced does not agree (within a defined limit) to the power/current as monitored, a status flag can be set reflecting that the powers/currents do not sum and the appropriate fault routines can be executed. Any number of actions can be undertaken in such a fault routine including, for example, warning the vehicle operator or preventing the vehicle from running. Additionally, control module 32 could examine the reported power/current consumption of each device to ensure that each device is operating within the prescribed limits of their power/current consumption restraint set by control module 32. If one or more devices exceeds the prescribed limits of their consumption/generation allotment (as defined by the limit command), appropriate steps can be taken such as warning the vehicle operator and/or disabling the device.

It is important to note that during a normal mode of power management, the control module 32 may issue 56 to each device a maximum positive electrical limit command and, where appropriate, a minimum negative limit command. Once each device is provided with the positive and negative electrical limit command, it is the responsibility of each device, not the control module 32, to manage its own (i.e. self-regulate) electrical consumption/generation of power or current within the limits defined by the maximum positive and maximum negative electrical limit command. In cases where a particular device cannot maintain full functionality while honoring the constraints of its electrical limit command defined by control module 32, it may request, from control module 32, an expansion of its positive or negative limit command values. Of course, depending on the prevailing conditions and the algorithm used by control module 32, control module 32 may determine that it is not prudent or otherwise desirable to honor the request of the device. In some applications, it may be desirable under well defined circumstances to allow certain devices to exceed the positive or negative limit commands issued by the control module 32; however, in the vast majority of applications, it is contemplated that in order for a single, centralized controller to effectively coordinate proper power/current flow within system 10, it will be desirable for control module 32 to be the final arbiter of electrical consuming/sourcing decisions.

In order for the control module to carry out one or more of its centralized monitoring tasks, one or more devices may, from time to time, report their actual power consumption to control module 32 by way of bus 30. In view of this reporting/accounting feature, control module 32 can determine if there are one or more devices attached to accessory power sub-bus 22 or bus 24 which are not properly registered. For example, if a device is attached to accessory power bus 22 but it is not participating in the bus protocol (e.g. does not communicate with control module 32 along bus 30), the device will still draw power/current from the accessory power sub-bus 22. Control module 32 may have the capability of measuring total system current $i_3$ by virtue of, for example, bus interface 12" connected to battery 12. However, when control module 32 computes the sum of the accessory currents (i.e. $i_1+i_2+\ldots i_n$), as they are reported to control module 32 by each accessory 16, 18, 20, the reported currents will not equate to the measured current $i_3$. Accordingly, control module 32 will be capable of detecting that there are unauthorized devices attached to the accessory power sub-bus or perhaps one or more devices have malfunctioned. In either case, any number of actions can be initiated including, for example, notifying the vehicle driver or disabling the vehicle ignition.

Figure 5:
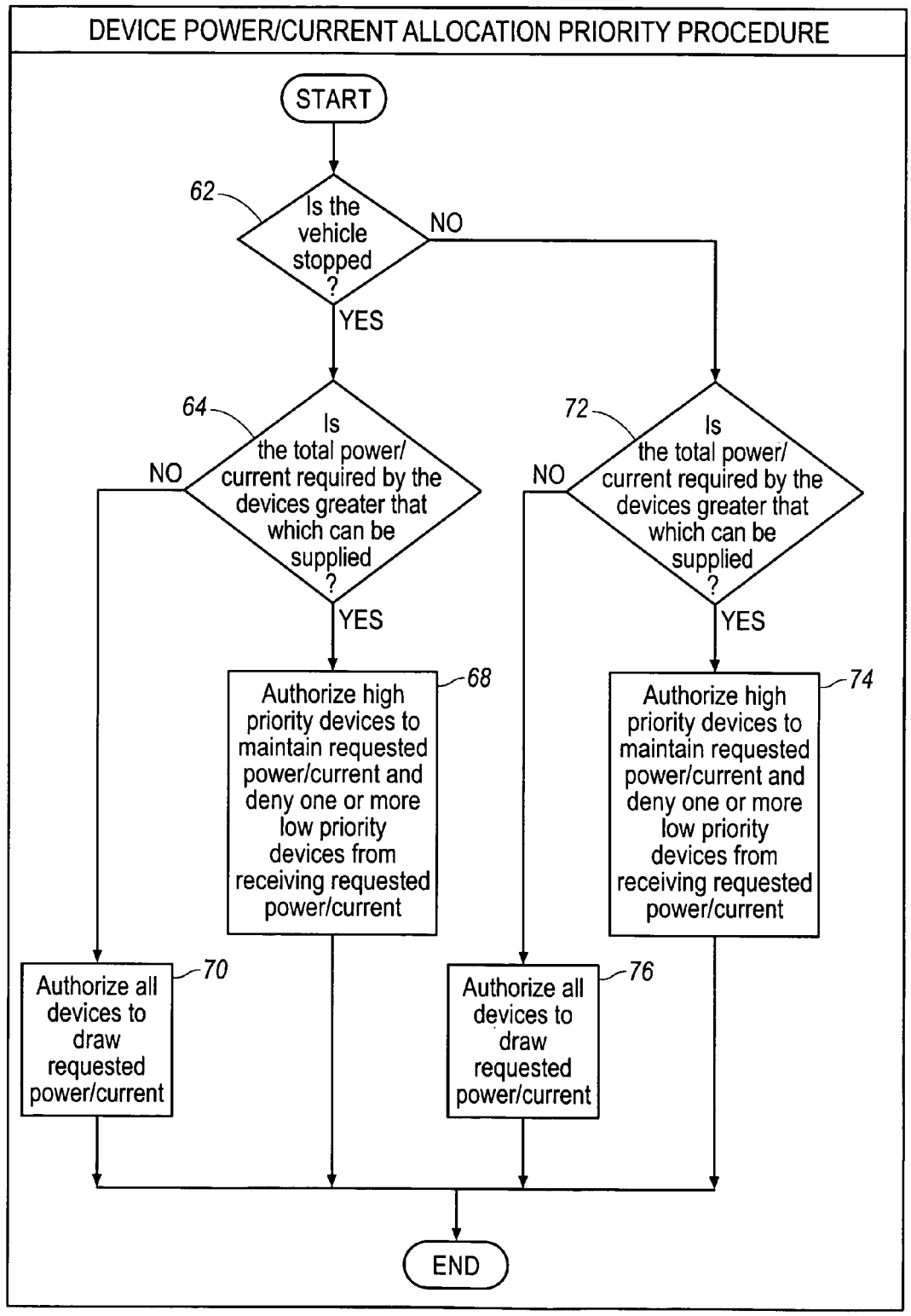
FIG. 5 is an exemplary procedure for allocating electrical power/current amongst devices according to an embodiment of the present invention.

Any number of priority algorithms can be used for allocating electrical energy amongst the devices 12, 14, 16, 18, 20. An example of one such priority algorithm is set forth in FIG. 5; however, other priority algorithms may also be suitable depending on the control strategy to be implemented in system 10. In some applications, it might be helpful if the priority algorithm considers whether the vehicle is moving 62. For example, if a vehicle is not moving, it may be acceptable to allocate less electrical energy to a particular device than it would otherwise be if the vehicle is moving. For example, if the vehicle is not moving, it may be acceptable to allocate very little electrical energy to the vehicle brake system. Obviously, if the vehicle is moving, it may never be appropriate to allocate less than full electrical energy to the vehicle brake system. If it is determined that the vehicle is stopped, control passes to logic step 64 where the control module 32 receives each accessory's required power/current request. If the sum of each accessory's required power/current request is greater than the power/current that the system can supply, the logic of step 68 is executed wherein the power/current requests of the highest priority devices are granted and the power/current requests of the lowest priority devices are denied 68 their request. In some applications, depending on the device, it may be acceptable for a device to operate at partial power/current. For example, if all of the power/current requested by a low priority device cannot be granted by control module 32, it may be possible for control module 32 to grant permission for a device to draw a portion of the power/current requested by a low priority device. In the case, for example, where the low priority device is a radio, it may be perfectly satisfactory to operate the radio at a reduced power/current (in some cases this may only adversely affect the maximum volume obtainable from the radio and may not adversely affect the operation of the radio). However, some devices are "all or nothing" type devices and may not operate satisfactorily with reduced power/current and they may not be manipulatable in this way. In the case of "all or nothing" devices, operating at less than full power may not be an option. If the total power/current required by the devices is not greater than that which can be supplied, step 70 is executed and control module 32 may authorize all devices to consume the power/current they have requested up to and including the maximum power/current allotted for the device.

Steps 72, 74, 76 are parallel to steps 64, 68, and 70 respectively except that a different priority scheme can be used in 74 to order the highest priority devices. For example, when the vehicle is not stopped, logic step 74 may set the highest priority to accessories such as steering, braking or other critical chassis functions and may set intermediate priorities to power generation (120 volts AC hotel loads) and climate control (A/C compressor) systems. Other lower priorities may be assigned to the radio and the like. For logic step 68 where priorities must be assigned to a vehicle that is stopped, there may not be a need to assign steering and braking with the highest priority.

The accessories 16, 18, 20 may be designed such that they can, when appropriate, request a priority reallocation from control module 32. For example, it may be appropriate in certain system designs for an accessory to have a low priority under certain circumstances but under other circumstances the same accessory could be justified in requiring a high priority. Such an algorithm could be included in the priority algorithm of FIG. 5 so that system 10 can be adaptable in any number of circumstances.

Figure 6:
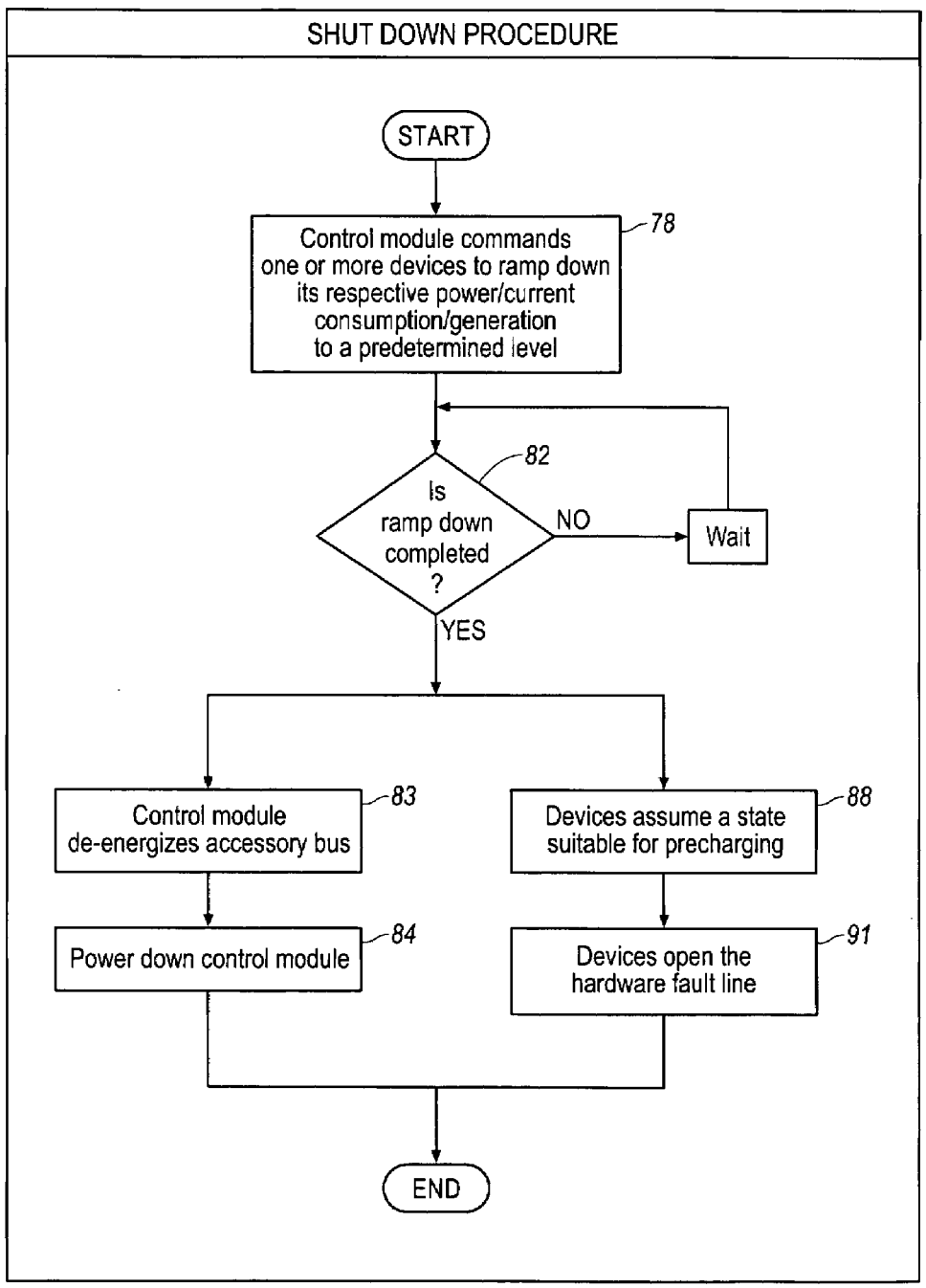
FIG. 6 sets forth exemplary steps that may be implemented in a shut down procedure according to an embodiment of the present invention.

Now referring to FIG. 6, shutdown begins 78 when control module 32 commands each accessory to ramp its power consumption/generation down to a predetermined level. This ramping down can be programmed to take place gradually over a predetermined period of time. In many cases, this predetermined level will be zero power consumption/generation. However, non-zero power levels might be appropriate in certain circumstances. Once the power consumption of each accessory device has reached its predetermined level 82, the control module 32 can de-energize the accessory bus 83 and thereafter the control module 32 can itself be powered down 84. Once rampdown is complete 82, each accessory, where appropriate, can be placed in a state suitable for precharging 88 (thereby preparing it for the next start up). Lastly, each accessory 16, 18, 20 opens its respective drop-out relay contact 16', 18', 20' thereby opening 91 hardware fault line 21. Although examples of normal modes of operation have been discussed in conjunction with FIGS. 4, 5 and 6, there are times where when exceptional conditions may prevail. Under exceptional conditions, extreme measures may be prudent. For example, in cases where control module 32 ceases from receiving bus communications from a device, the appropriate fault can be raised by control module 32 (such as a "currents do not sum" fault). Under some conditions, it may be appropriate to wait a predetermined period of time to determine if the fault condition "corrects itself." In cases where a device loses message communication with the control module, it might be appropriate for the device to go into a shut down mode where the accessory disconnects itself from the accessory bus 22. In cases where the "currents do not sum" fault is active, it might be appropriate to simply warn the driver of the presence of the fault condition especially if the vehicle is in motion or the transmission is in gear. Under these conditions, it might be prudent to continue to supply power to the sub-bus 22. If the "currents do not sum" fault is active and the vehicle is stopped, and the transmission is in neutral or park, it might be appropriate to program the control module 32 to disconnect the accessory bus 22 from battery 12.

The present invention has been particularly shown and described with reference to the forgoing embodiments, which are merely illustrative of the present invention and are not meant to be restrictive. For example, some functional distinctions have been made herein between devices such as accessories, 16, 18 and 20 and devices such as battery 12, motor controller 14, and junction box 26. All of these devices can include a bus interface which allows them to communicate with control module 32. However, in some cases (depending on the particulars of the electronic hardware used within the device or the device's operating unit), some or all of the functionality that has been described in conjunction with accessories 16, 18 and 20 may not be appropriate for other types of devices (such as battery 12, junction box 26, motor controller 14). Also, much explanation has been presented regarding the power/current requested by a device and the power/current consumption permitted by the control module 32. The use of the term "power" throughout this application should not be construed solely accordingly to the technical definition of electrical power (i.e. wattage). It is known to those skilled in the art that other metrics for measuring electrical energy transfer (e.g. current, voltage, magnetic field strength, etc.) can often be used as surrogates or proxies for traditional energy measurement techniques (especially when they are combined with certain assumptions) and still offer sufficient estimation of electrical energy flow to carry out the spirit of this invention. Additionally, communication bus 30 has been shown and discussed in the context of a tangible bus (i.e. a bus fabricated from copper conductors, optical fibers, and the like). However, nothing in this disclosure should be interpreted to limit bus 30 to a tangible bus structure and it is contemplated that bus 30 can also include any wireless communication system that is effective for facilitating information transfer between and amongst devices or between devices and control module 32.

It is intended that the following claims define the scope of the invention and that the method and apparatus within the scope of these claims and their equivalent be covered thereby. The description of the invention should be understood to include all novel and non-obvious combinations of elements described herein and claims may be presented in this or later applications to any novel and non-obvious combination of these elements. Moreover, the foregoing embodiments are illustrative and no single feature or element is essential to all possible combinations that may be claimed in this or a later application.

What is claimed is:

1. A method of controlling a plurality of electrical accessory devices coupled to a control module by an electrical power bus, comprising the steps of:

issuing a maximum, positive electrical limit command and a minimum, negative electrical limit command to one or more of said plurality of electrical accessory devices from said control module;

requesting, from said one or more of said plurality of electrical accessory devices to a control module, an expansion of the maximum, positive electrical limit command, or, an expansion of the minimum, negative electrical limit command of said one or more of said plurality of electrical accessory devices; and determining, within said control module, whether to honor said request from said one or more of said plurality of electrical accessory devices.

* * * * *